United States Patent [19]

Jones

[11] 3,749,918

[45] July 31, 1973

[54] APPARATUS FOR DETERMINING WHEN THE SIZE OF AN OBSTACLE IN THE PATH OF A VEHICLE IS GREATER THAN A PREDETERMINED MINIMUM

[75] Inventor: Trevor O. Jones, Birmingham, Mich.

[73] Assignee: General Motors Corporation, Detroit, Mich.

[22] Filed: May 17, 1972

[21] Appl. No.: 254,253

[52] U.S. Cl. .............................. 250/208, 340/258 R
[51] Int. Cl. ........................................... H01j 39/12
[58] Field of Search .................. 250/208; 340/258 R

[56] References Cited
UNITED STATES PATENTS

| | | | |
|---|---|---|---|
| 3,448,274 | 6/1969 | Altman | 250/208 |
| 3,036,219 | 5/1962 | Thompson | 250/208 |
| 2,813,983 | 11/1957 | Hammar | 250/208 |

Primary Examiner—Harold A. Dixon
Attorney—C. R. Meland, Howard N. Conkey et al.

[57] ABSTRACT

An apparatus for determinng when the size of an obstacle in the path of a vehicle is greater than a predetermined minimum including a plurality of narrow angle photosensitive detectors and laser emitters. The photosensitive detectors and laser emitters are displaced geometrically to generate a unique sensing zone for each photosensitive detector, the sensing zones being spaced one from another such that the distances therebetween are representative of an obstacle of interest when the obstacle spans a predetermined number of sensing zones. The outputs of the photosensitive detectors are monitored and when the obstacle spans the predetermined number of sensing zones, an output is generated to provide an indication that the size of the obstacle is greater than the predetermined minimum.

2 Claims, 3 Drawing Figures

PATENTED JUL 3 1 1973 3,749,918

APPARATUS FOR DETERMINING WHEN THE SIZE OF AN OBSTACLE IN THE PATH OF A VEHICLE IS GREATER THAN A PREDETERMINED MINIMUM

This invention relates to an apparatus for providing an indication when the size of an object is greater than a predetermined minumum.

When a simple Doppler radar system is used, for example in a vehicle predictive crash detector, it is difficult to correlate the actual physical size of an obstacle with its radar cross section. It is the general object of this invention to provide an apparatus for determining when the size of an obstacle in the path of the vehicle is greater than a predetermined minimum.

It is another object of this invention to provide for a laser detector for use in a vehicle to provide an indication when an obstacle in the path of the vehicle is greater than a predetermined minimum.

These and other objects of this invention are accomplished by illuminating the general field of interest in the path of a vehicle by at least one laser emitter which, by its nature, has a well controlled beam. A series of photosensitive detectors combine with the laser emitter to generate a unique sensing zone for each photosensitive detector and are arranged on the front of the vehicle such that their pitch or distance between them is representative of a target of interest if seen simultaneously by a predetermined number of adjacent photosensitive detectors. The outputs of the photosensitive detectors are monitored and a signal is generated when the predetermined number of adjacent detectors sense an obstacle.

The invention may be best understood by reference to the following description of a preferred embodiment and the drawings in which.

Figure 1:
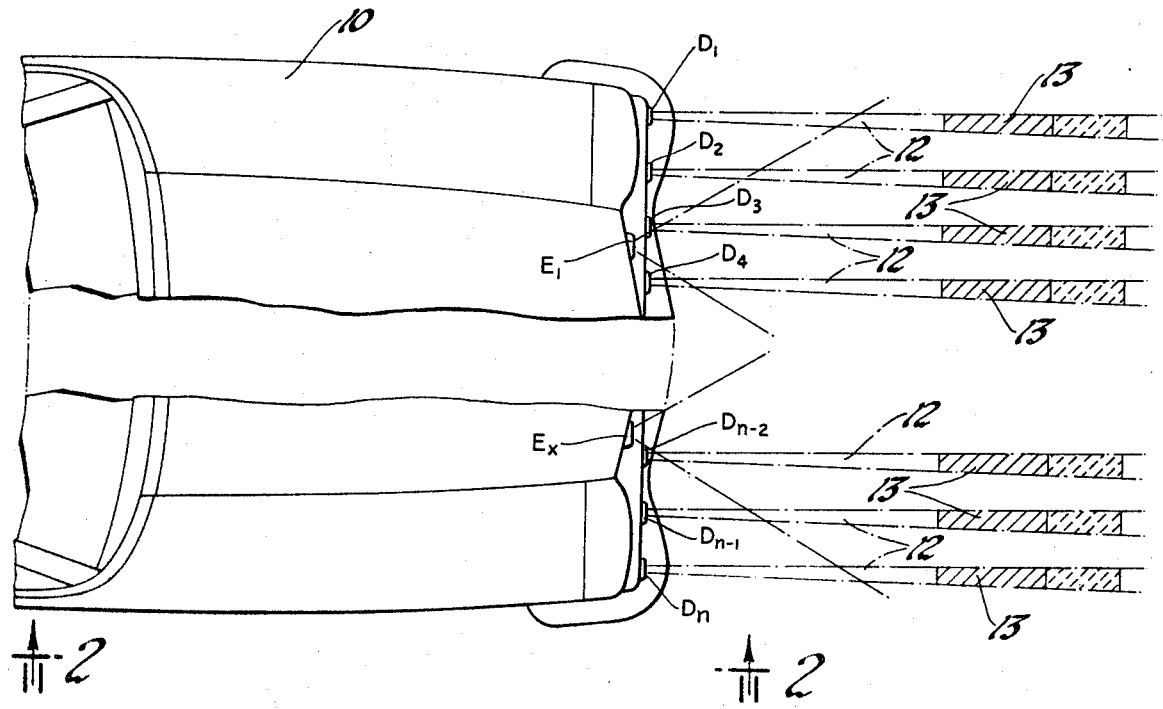
FIG. 1 is a schematic diagram of a vehicle having the photosensitive detectors and laser emitters mounted thereon.
Figure 2:
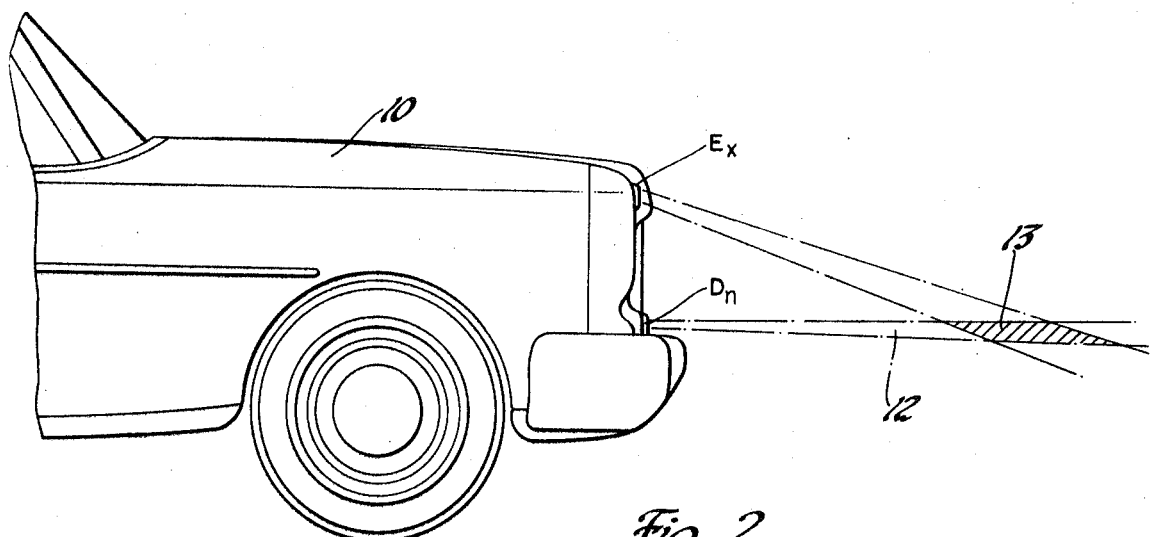
FIG. 2 is a view along lines 2—2 of FIG. 1 illustrating the intersection of the laser beam and the sensing corridors of the photosensitive detectors.

Referring to FIGS. 1 and 2, a vehicle 10 has mounted on the forward portion thereof a plurality of photosensitive detectors $D_1$, $D_2$, $D_3$, $D_4$, ..., $D_{n-2}$, $D_{n-1}$ and $D_n$, where $n$ is an integer determined by parameters such as vehicle width and the size of the obstacle to be detected. The photosensitive detectors $D_1$ through $D_n$ are highly directive, narrow angle detectors each having a sensing corridor 12.

Conventional laser emitters $E_1$, ..., $E_x$ are mounted on the vehicle in a manner so as to illuminate any obstacle in the range of interest in front of the vehicle as defined by the intersection of the sensing corridors 12 and the light output of the laser emitters $E_1$ through $E_x$. The number of laser emitters such as $E_1$ and $E_x$ is limited only by a number required to illuminate the range of interest and may be, for example, a single emitter. The intersections of the sensing corridors 12 and the light output of the emitters $E_1$ through $E_x$ define a plurality of sensing zones 13 within which an obstacle will reflect the light output of the laser emitters $E_1$ through $E_x$ to the photosensitive detectors $D_1$ through $D_n$.

The photosensitive detectors $D_1$ through $D_n$ are arranged on the vehicle such that their pitch or distance between the sensing corridors 12 at the sensing zones 13 is representative of an obstacle of interest if the obstacle spans a predetermined number of adjacent sensing zones 13.

Figure 3:
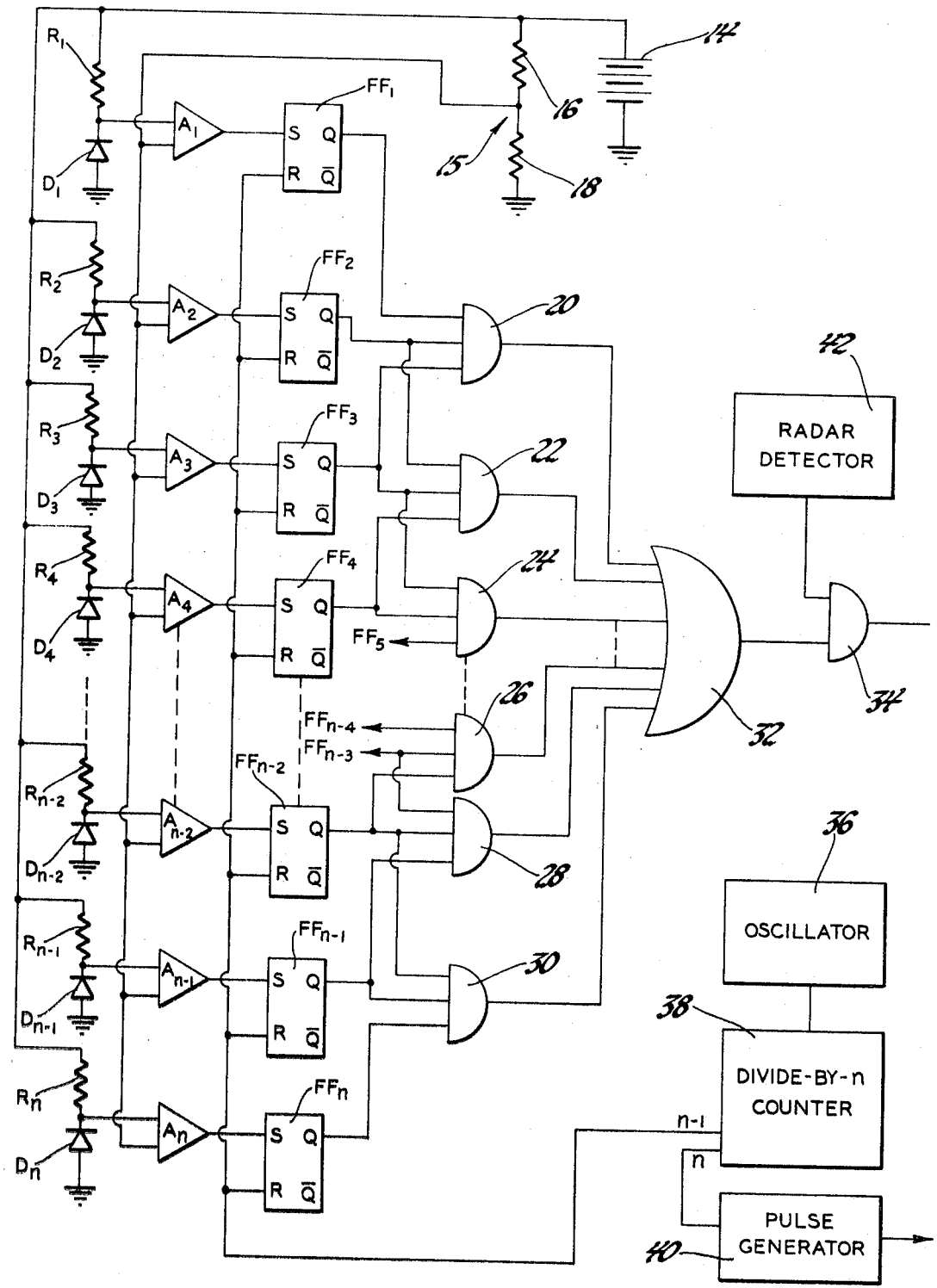
FIG. 3 is a schematic of the circuit for providing an indication when a predetermined number of adjacent detectors sense the presence of an object.

Referring to FIG. 3, there is shown a circuit for generating an output signal when an obstacle is of a predetermined size, as determined by the intersection thereof with a predetermined number of sensing zones 13. For purposes of illustration only, it will be assumed that it is desired to determine when an object is of sufficient size to span three adjacent sensing zones 13. Each of the photosensitive diodes $D_1$ through $D_n$ are series connected with a resistor $R_1$, $R_2$, $R_3$, $R_4$, ..., $R_{n-2}$, $R_{n-1}$, and $R_n$, respectively, each of said series circuits being connected in parallel with a DC voltage source 14 whose negative terminal is grounded. The junction between the photosensitive diodes $D_1$ through $D_n$ and the respective resistors $R_1$ through $R_n$ in the aforementioned series circuits are connected to one input of a comparator $A_1$, $A_2$, $A_3 A_4$, ..., $A_{n-2}$, $A_{n-1}$, and $A_n$, respectively. A reference voltage is supplied to a second input of each of the comparators $A_1$ through $A_n$ by a voltage divider 15 comprised of a resistor 16 and a resistor 18 connected in shunt with the DC voltage source 14. The outputs of the comparators $A_1$ through $A_n$ are supplied to the set inputs of flip-flops $FF_1, FF_2, FF_3, FF_4, ..., FF_{n-2}, FF_{n-1}$, and $FF_n$, respectively. The Q outputs of each combination of three adjacent flip-flops among the flip-flops $FF_1$ through $FF_n$ are supplied respectively to AND gates, 20, 22, 24, 26, 28, and 30.

When all of the flip-flops associated with any of the aforementioned combinations are set, the respective AND gate 20, 22, 24, 26, 28, or 30 is enabled to supply a voltage to an OR gate 32 which in turn is enabled to supply an output to one input of an AND gate 34.

An oscillator 26 supplies a series of pulses at a predetermined frequency to a divide-by-$n$ counter 38. On the count of $n-1$, the divide-by-n counter 38 supplies a reset signal to the reset inputs of the flip-flops $FF_1$ through $FF_n$ which are reset thereby to place the Q outputs thereof at ground potential. On the count of n, the divide-by-$n$ counter 38 supplies a signal to a pulse generator 40 which in turn pulses the laser emitters $E_1$ through $E_x$ which generate a light pulse to illuminate the range of interest previously described. If an obstacle in front of the vehicle 10 intersects one or more of the sensing zones 13, the photosensitive diodes $D_1$ through $D_n$ associated therewith senses the light reflected from the obstacle to generate outputs which are supplied to the respective comparators $A_1$ through $A_n$ which supply output signals effective to set the respective flip-flops $FF_1$ through $FF_n$. When the divide-by-$n$ counter 38 counts through to the $n-1$ count, the flip-flops $FF_1$ and $FF_n$ are reset and another pulse is generated by the pulse generator 40 upon the occurrence of the n count of the divide-by-$n$ counter 38 to again pulse the laser emitters $E_1$ through $E_x$. The foregoing sequence is cyclically repeated so as to continually monitor the area in front of the vehicle 10 for obstacles which may be present. If the obstacle is greater than the predetermined minimum size as previously defined, at least three adjacent sensing zones 13 will be intersected thereby, the intersection of which will be sensed by at least three adjacent photosensitive diodes among the photosensitive diodes $D_1$ through $D_n$. Conseqently, at least three adjacent flip-flops $FF_1$ through $FF_n$ will be set to supply a voltage to the respective AND gate 20, 22, 24, 26, 28 or 30 which is enabled thereby to supply a voltage to the OR gate 32 which in turn is enabled to supply a voltage to the AND gate 34. In the foregoing manner, an output signal is generated by the OR gate 32 any time an obstacle having a size greater than a predetermined minimum intersects the sensing zones 13.

The aforementioned system can be used, for example, in conjunction with a radar detector 42 which can be a simple Doppler radar type which detects the presence of an obstacle and generates a signal representing relative velocity between the vehicle 10 and the obstacle. The output of the radar detector 42 can be used in conjunction with the apparatus of the present invention to generate an output when an obstacle is of the predetermined size and when the relative velocity between the vehicle 10 and the obstacle is at a certain level. This is accomplished by supplying a voltage from the radar detector 42 to the AND gate 34 when the relative velocity is at the certain level which is enabled to supply a voltage when the OR gate 32 supplies a voltage thereto.

Although the foregoing description of the prefrred embodiment describes an apparatus for generating an output when an obstacle is detected having a predetermined minimum size, it will be readily understood by one skilled in the art that the output of the flip-flops $FF_1$ through $FF_n$ could be utilized to determine the approximate size of an object by monitoring the number of adjacent flip-flops whose Q output is set to a high level.

It will be understood by one skilled in the art that the frequency of the oscillator 36 must be such that the area in front of the vehicle 10 is monitored at a frequency which assures that an obstacle will not traverse the sensing corridors 13 between the monitoring periods at all relative velocities between the vehicle 10 and the obstacle.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. An apparatus for providing an indication when the size of an obstacle in a specified area in the path of a vehicle is greater than a predetermined minimum comprising a plurality of linearly spaced narrow angle photosensitive detectors, each of said photosensitive detectors having a unique sensing corridor extending through the area in the path of the vehicle and being spaced apart so that an obstacle having a size greater than the predetermined minimum intersects at least a predetermined number n of the sensing corridors when within the specified area; light generating means for illuminating the specified area to create a unique sensing zone in the sensing corridor of each photosensitive detector within which an obstacle reflects light from the light generating means to the photosensitive detector; and a plurality of gate means respectively coupled to all of the combinations of $n$ adjacent photosensitive detectors, each of said gate means generating an output signal when an obstacle reflects light to all of the photosensitive detectors in the combination of n adjacent photosensitive detectors associated therewith, the output signal being an indication that the size of the object is greater than the predetermined minimum.

2. An apparatus for providing an indication when the size of an obstacle in a specified area in the path of a vehicle is greater than a predetermined minimum comprising a plurality of linearly spaced narrow angle photosensitive detectors, each of said photosensitive detectors having a unique sensing corridor extending through the area in the path of the vehicle and being spaced apart so that an obstacle having a size greater than the predetermined minimum intersects at least a predetermined number n of the sensing corridors when within the specified area; light generating means responsive to an energizing pulse applied thereto for illuminating the specified area to create a unique sensing zone in the sensing corridor of each photosensitive detector within which an obstacle reflects light from the light generating means to the photosensitive detector; a plurality of bistable means respectively coupled to the photosensitive detectors, each of the bistable means being shiftable between first and second states and being responsive to the photosensitive detector associated therewith for shifting to the first state when said photosensitive detector detects light reflected from an object; a plurality of gate means respectively coupled to all of the combinations of n bistable means associated with n adjacent photosensitive detectors, each of said gate means generating an output signal when the bistable means associated therewith are in the first state; and clocking means for cyclically shifting all the bistable means to the second state and supplying an energizing pulse to the light generating means, whereby an output signal is generated by at least one gate means when the size of an obstacle in the specified area in the path of the vehicle is greater than the predetermined minimum.

* * * * *